United States Patent
Lu

(12) United States Patent (10) Patent No.: US 7,617,417 B2
(45) Date of Patent: Nov. 10, 2009

(54) METHOD FOR READING INPUT/OUTPUT PORT DATA

(75) Inventor: Ying-Chih Lu, Taipei (TW)

(73) Assignee: Inventec Corporation, Taipei (TW)

( * ) Notice: Subject to any disclaimer, the term of this patent is extended or adjusted under 35 U.S.C. 154(b) by 442 days.

(21) Appl. No.: 11/675,458

(22) Filed: Feb. 15, 2007

(65) Prior Publication Data
US 2008/0147894 A1 Jun. 19, 2008

(30) Foreign Application Priority Data
Dec. 15, 2006 (TW) .............................. 95147055 A

(51) Int. Cl.
*G06F 11/00* (2006.01)
(52) U.S. Cl. ........................................... 714/33; 710/1
(58) Field of Classification Search .................. 714/33, 714/43, 44, 45, 56; 710/1–3, 5, 7–8, 36, 710/48
See application file for complete search history.

(56) References Cited

U.S. PATENT DOCUMENTS

| | | | | |
|---|---|---|---|---|
| 4,695,945 A | * | 9/1987 | Irwin | 710/36 |
| 5,610,601 A | * | 3/1997 | Lahti et al. | 341/22 |
| 6,070,204 A | * | 5/2000 | Poisner | 710/100 |
| 6,216,183 B1 | * | 4/2001 | Rawlins | 710/100 |
| 6,496,891 B1 | * | 12/2002 | Cluff et al. | 710/260 |

* cited by examiner

*Primary Examiner*—Dieu-Minh Le
(74) *Attorney, Agent, or Firm*—J.C. Patents

(57) ABSTRACT

A method for reading input/output port data is provided. In the present method, a write trap procedure is enabled so that the data is stored in a buffer first when there is data to be written in the input/output port. Then, a read trap procedure is enabled so that the data stored in the buffer is read out and used as the data of the input/output port when there is a need to read the data of the input/output port. Therefore, the defect in the prior art that the basic input/output system (BIOS) in a direct input/output mode can only be written in but cannot be read out is resolved.

18 Claims, 3 Drawing Sheets

METHOD FOR READING INPUT/OUTPUT PORT DATA

CROSS-REFERENCE TO RELATED APPLICATION

This application claims the priority benefit of Taiwan application serial no. 95147055, filed Dec. 15, 2006. All disclosure of the Taiwan application is incorporated herein by reference.

BACKGROUND OF THE INVENTION

1. Field of the Invention

The present invention relates to a method of reading data, and more particularly, to a method for reading input/output (I/O) port data.

2. Description of Related Art

In the current computer systems, the basic input/output system (BIOS) is triggered first for performing a complete diagnostic and testing procedure of the hardware equipment inside the computer when the user presses down the 'Power On' key. This diagnostic and testing procedure is commonly referred to as a power-on self test (POST). If the hardware equipment of the computer passes the diagnostic and testing procedure, the BIOS will transfer hardware information inside the computer to an operating system so that the operating system can continue with the startup procedure. However, if a certain component inside the computer functions abnormally, the startup procedure would be arrested at a certain stage and the computer would fail to start properly.

To speed up system development and debugging in the early days of computer system design, IBM has defined a special input/output (I/O) port for detection and debugging. The corresponding I/O address of this special I/O port is 80h. In a real application of the I/O port with 80h address, a plurality of power-on self test (POST) codes is first saved inside the BIOS with each code representing a different stage of the power-on self test. When the computer enters a particular stage of the power-on self test, the POST code representing this stage are transferred to the I/O port with the 80h address. Therefore, before the power-on procedure reaches the stage where the control is transferred to the operating system, any abnormal power-on condition can be traced back to the abnormality of a particular computer component by finding the code in I/O address 80h and looking up the detection stage corresponding to this code.

The foregoing POST code is displayed by sending to a group of light emitting diodes (LED) disposed on a motherboard or a debugging card so that an engineer can pinpoint the system component with the problem from the displayed code. In addition, the BIOS also tests the dual in line memory module (DIMM) and the fan after power on. If any errors are found, an error signal will be prompted and displayed through another group of LED.

FIG. 1 is a conventional power-on self test (POST) system structure. As shown in FIG. 1, the POST system 100 includes a super input/output (I/O) chip 110 and two serial/parallel converters 120 and 130, LED 140 corresponding to DIMM test failure, LED 150 corresponding to fan test failure, and LED 160 corresponding to the POST code of the I/O port 80h. After turning the computer on, a dual-in-line memory module (DIMM) test, a fan test, and a power-on self test are carried out respectively. The test results are transmitted as serial codes from the super I/O chip 110 to the serial/parallel converters 120 and 130 through input/output (I/O) ports GEX1 and GEX2. After the serial codes are converted to parallel codes through the serial/parallel converters 120 and 130, the outcome are shown through the LED 140 for displaying DIMM test failure, the LED 150 for displaying fan test failure, and the LED 160 for displaying I/O port 80h.

However, the super I/O chip has some practical limitations when executing the testing operation. For example, the NS427 super I/O chip developed by National Semiconductor Corporation has defined two modes of operation, namely, the direct I/O decoding mode and the general purpose I/O base (GPIO base) mode. Table 1 below makes a contrast between these two modes. As shown in FIG. 1 and Table 1, the direct I/O mode is used when the BIOS executes the POST. Under the direct I/O mode, the GEX1 and the GEX2 can only execute write operations. Furthermore, the GPIO base mode is used after executing the POST. Under the GPIO base mode, the GEX1 can execute write operations but the GEX2 cannot execute write/read operations.

TABLE 1

| State | Mode | GEX1 | GEX2 |
|---|---|---|---|
| BIOS POST | Direct I/O | Writable | Writable |
| After BIOS POST | GPIO base | Writable/Readable | No function |

However, the foregoing direct I/O mode prevents the BIOS from obtaining the data from the GEX1 when the BIOS executes the POST or even after the operating system is taken over. Other software is also prevented from reading or using the data. Hence, without knowing whether the DIMM and the fan operate normally, it is possible that the control of the DIMM and the fan are continued, thereby causing a number of unpredictable problems

SUMMARY OF THE INVENTION

Accordingly, the present invention is directed to a method for reading data of an input/output (I/O) port. By storing up data previously written in the I/O port to serve as subsequent data for read-out, the data of the I/O port can be simultaneously written in or read out by a basic input/output system (BIOS) even when the BIOS is in the process of executing a power-on self test or after the operation system has already taken control.

To achieve these and other advantages, as embodied and broadly described herein, the invention provides a method for reading input/output (I/O) port data, in particular, for reading the read-out data of an input/output (I/O) port. The method includes the following steps. First, a write trap procedure is enabled to trap the write procedure in the I/O cycle for writing to the I/O port. When the write procedure is trapped, an interrupt request is sent to a processor. Then, the context data of the processor is stored, which includes the write data of the I/O port. Thereafter, a read trap procedure is enabled to trap the read procedure in the I/O cycle for reading from the I/O port. When the read procedure is trapped, an interrupt request is also sent to the processor and the previously stored write data is read to serve as the read data of the I/O port.

According to the method for reading I/O port data in the preferred embodiment of the present invention, the processor enters into a system management mode (SMM) after receiving an interrupt request.

According to the method for reading I/O port data in the preferred embodiment of the present invention, the method further includes disabling the write trap procedure and reexecuting the write procedure in the I/O cycle for writing to the I/O port after storing the write data. After the execution of the write procedure is finished, the write trap procedure is enabled again.

According to the method for reading I/O port data in the preferred embodiment of the present invention, the step of reexecuting the write procedure in the I/O cycle for writing to the I/O port includes writing the write data to the I/O port. Then, according to the write data, the I/O port outputs the test message. The test message includes a dual-in-line memory module (DIMM) failure message, a fan failure message or a port 80 error detection message. The test message is displayed through a light emitting diode (LED).

According to the method for reading I/O port data in the preferred embodiment of the present invention, the context data is stored in a buffer for processing procedures. The step of executing the processing procedure for reading the previously stored write data to serve as the read data of the I/O port includes replicating the input data stored in the buffer in a register of the processor. Then, the input data stored in the register is used as the read data of the I/O port.

According to the method for reading I/O port data in the preferred embodiment of the present invention, the step of replicating the input data stored in the buffer to the register of the processor includes replicating the stored context data to the processor so that the processor returns to a normal operation.

According to the method for reading I/O port data in the preferred embodiment of the present invention, after the write procedure is trapped and an interrupt request is sent to the processor, further includes executing a processing procedure to replicate the write data in the buffer, and after the read procedure is trapped and an interrupt request is sent to the processor, further includes executing a processing procedure to replicate the write data from the buffer back to an interrupt data region.

According to the method for reading I/O port data in the preferred embodiment of the present invention, the interrupt request includes a system management interrupt (SMI).

According to the method for reading I/O port data in the preferred embodiment of the present invention, the I/O port is the I/O port of a super I/O chip. The super I/O chip uses a direct I/O mode when executing a power-on self test (POST) and still uses the direct I/O mode after executing the POST.

According to the method for reading I/O port data in the preferred embodiment of the present invention, the I/O port includes port 80.

According to the method for reading I/O port data in the preferred embodiment of the present invention, the interrupt request is sent from a South Bridge chip.

According to the method for reading I/O port data in the preferred embodiment of the present invention, the processing procedure includes a SMI handler.

In the present invention, a write trap procedure is enabled so that the data is stored in a buffer first when there is data to be written to the I/O port. Then, a read trap procedure is enabled so that the data of the I/O port can be directly read from the buffer when there is a need to read the data. Thus, the defect in the prior art that a super I/O chip in a direct input/output mode can only be written in but cannot be read out is resolved.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figure 1:
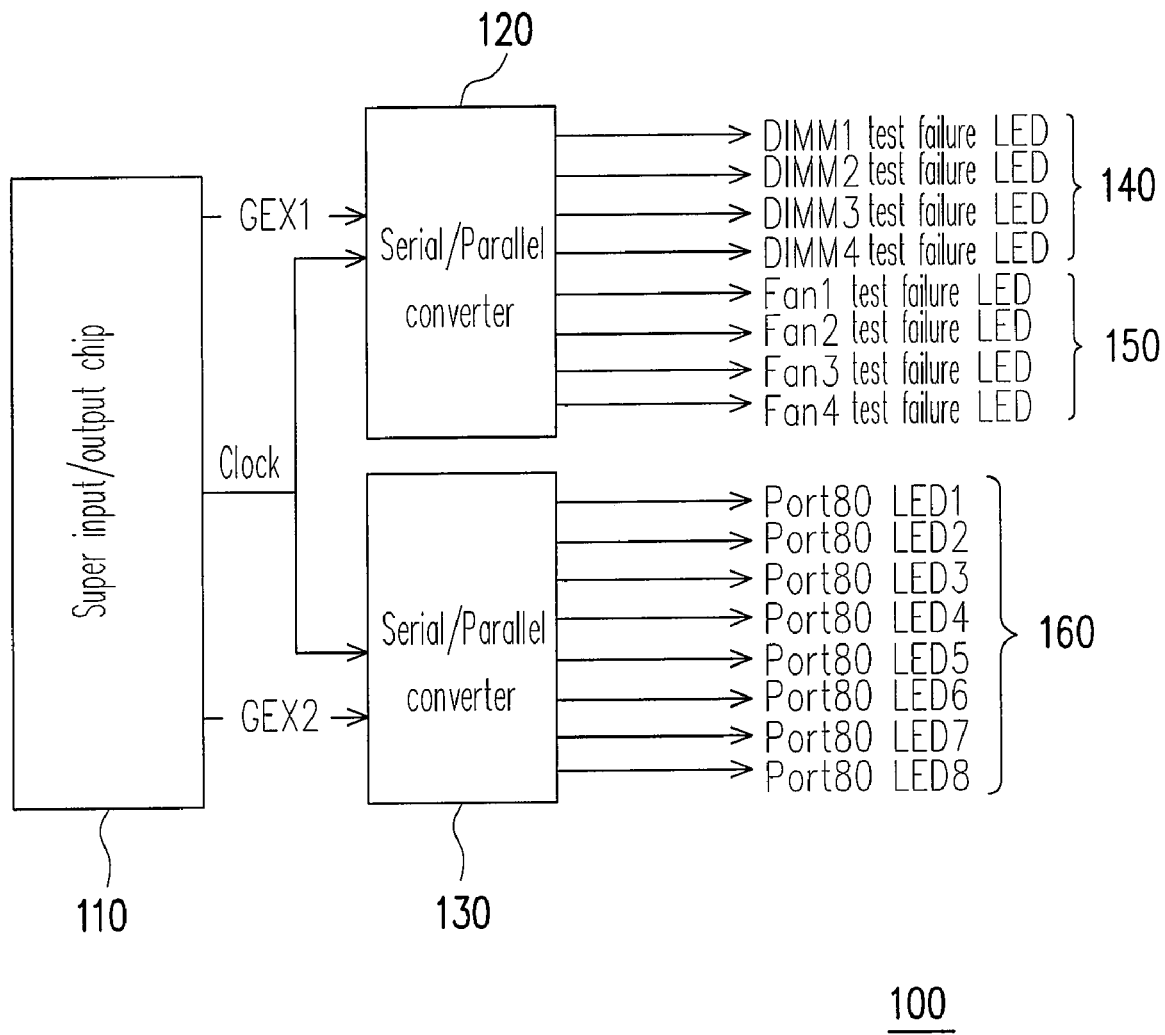
FIG. 1 is a conventional power-on self test (POST) system structure.

Reference will now be made in detail to the present preferred embodiments of the invention, examples of which are illustrated in the accompanying drawings. Wherever possible, the same reference numbers are used in the drawings and the description to refer to the same or like parts.

To respond to a sudden request from another device when a processor is in normal operation, the computer is provided with an interrupt mechanism for requesting the processor to suspend its current job temporarily and process other jobs with a higher priority. The present invention applies this interrupt mechanism to the power-on self test (POST) of a basic input/output system (BIOS). Moreover, after starting the operating system, the interrupt mechanism is automatically triggered whenever there is data to be written into the input/output (I/O) port so that the write data is first stored elsewhere. When there is a need for the write data, it can be read and used to achieve the goal of monitoring the system states at all times. To have a better understanding of the content of the present invention, embodiments are given in the following to act as examples showing the feasibility of actually implementing the present invention.

Figure 2:
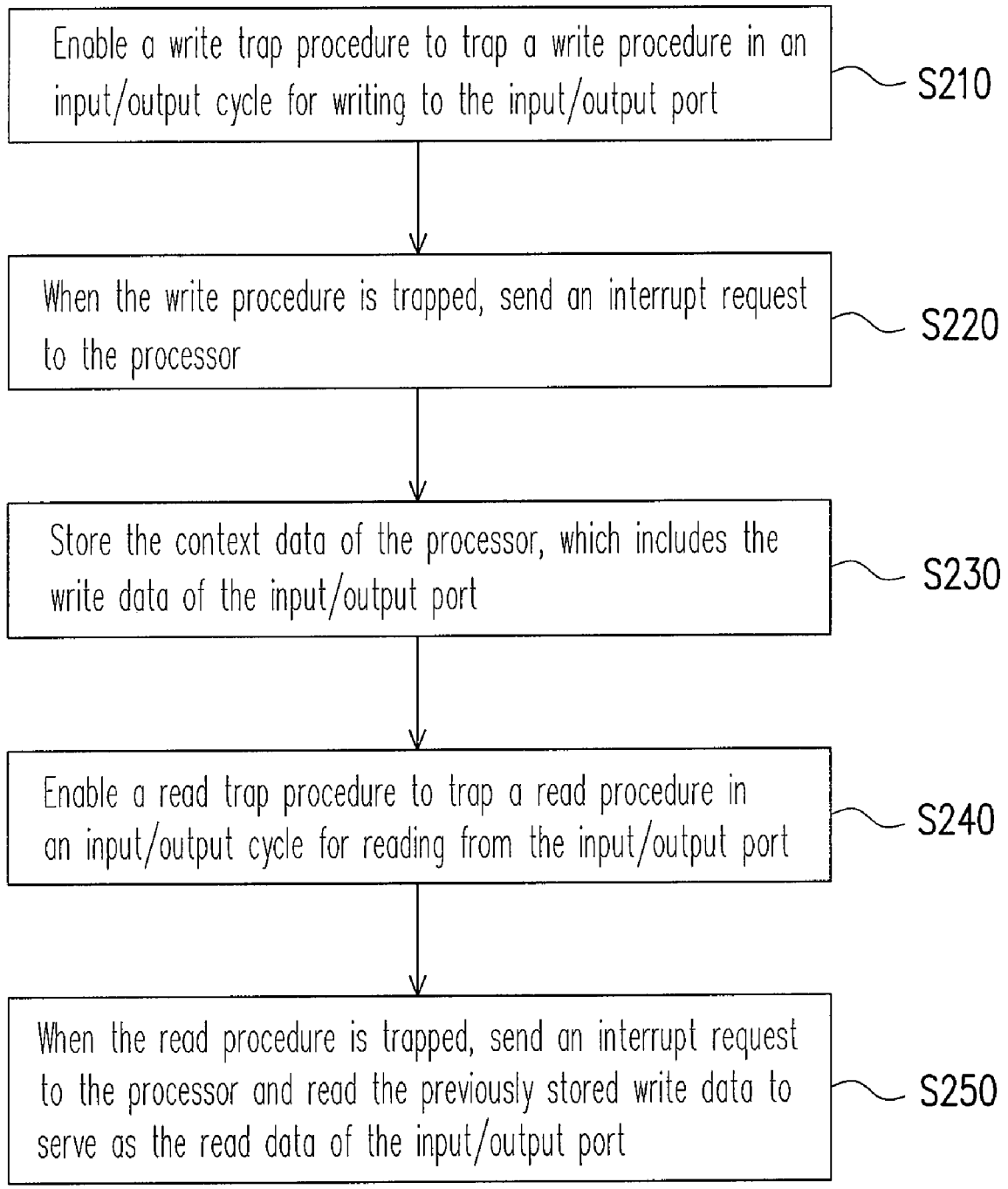
FIG. 2 is a flow diagram showing a method for reading input/output port data according to one preferred embodiment of the present invention.

FIG. 2 is a flow diagram showing a method for reading input/output port data according to one preferred embodiment of the present invention. As shown in FIG. 2, the present embodiment a method of reading data from a specific input/output port while a basic input/output system (BIOS) is in the process of executing a power-on self test (POST) or after the operating system has taken over the control. If the present embodiment is applied to a super input/output chip, for example, the super input/output chip uses a direct input/output decode mode when executing the power-on self test. Therefore, only the write operation can be executed on the input/output port (for example, GEX1 in FIG. 1) of the super input/output chip.

Figure 3:
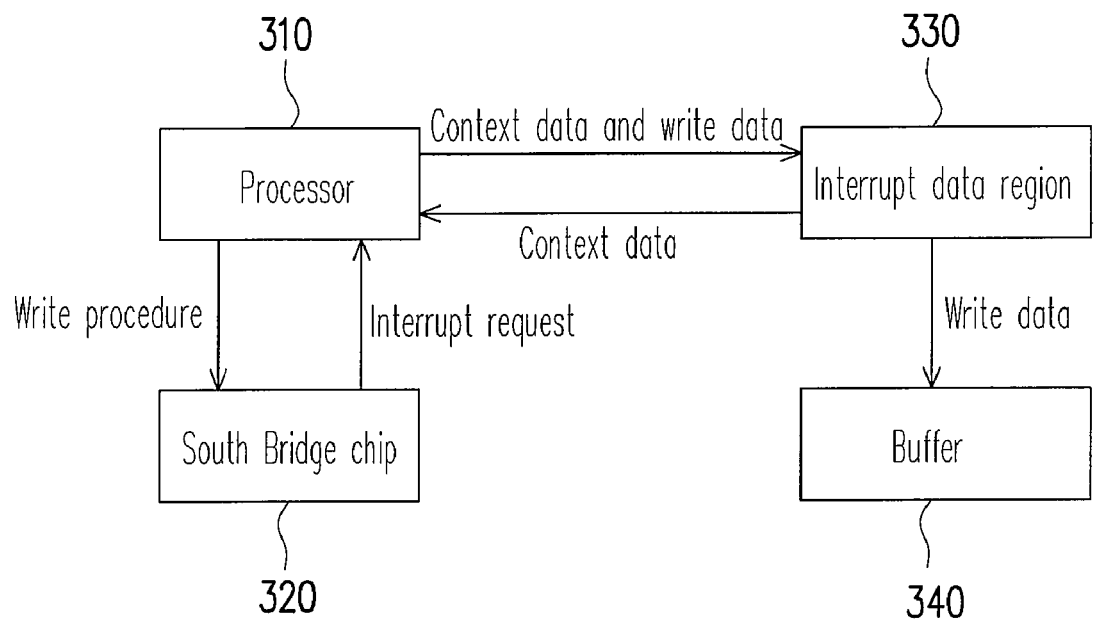
FIG. 3 is a diagram showing a process of storing write data according to one preferred embodiment of the present invention.

FIG. 3 is a diagram showing a process of storing write data according to one preferred embodiment of the present invention. As shown in FIG. 2 and FIG. 3, in order to read I/O port data, the present invention first enables a write trap procedure through the processor 310. When the write trap procedure is enabled, the South Bridge chip 320 of the system traps a write procedure for writing to the I/O port in an I/O cycle (step S210).

When the South Bridge chip 320 traps any data for writing to the I/O port, it sends out an interrupt request to the processor 310 to inform the processor 310 about the dismissing of the current I/O cycle (step S220). The interrupt request is, for example, a request for a system management interrupt (SMI). When the processor 310 receives the interrupt request and at the same time the current input/output cycle is discarded, a system management mode (SMM) is activated to process any sudden event.

Meanwhile, the context data of the processor and the data originally for writing to the I/O port are stored in an interrupt data region 330. Thereafter, a processing procedure is executed to replicate the write data stored in the interrupt data region 330 in a buffer 340 for processing procedure to serve as a subsequent reference (step S230). At the end of the processing procedure, the processor 310 reads back the original context data from the interrupt data region and ends the system management mode so that the processor 310 can return to normal operation.

Next, the present embodiment further requires the processor 310 to enable a read trap procedure so that the South Bridge chip 320 of the system may trap a read procedure for reading data from the I/O port in an I/O cycle (step S240).

Figure 4:
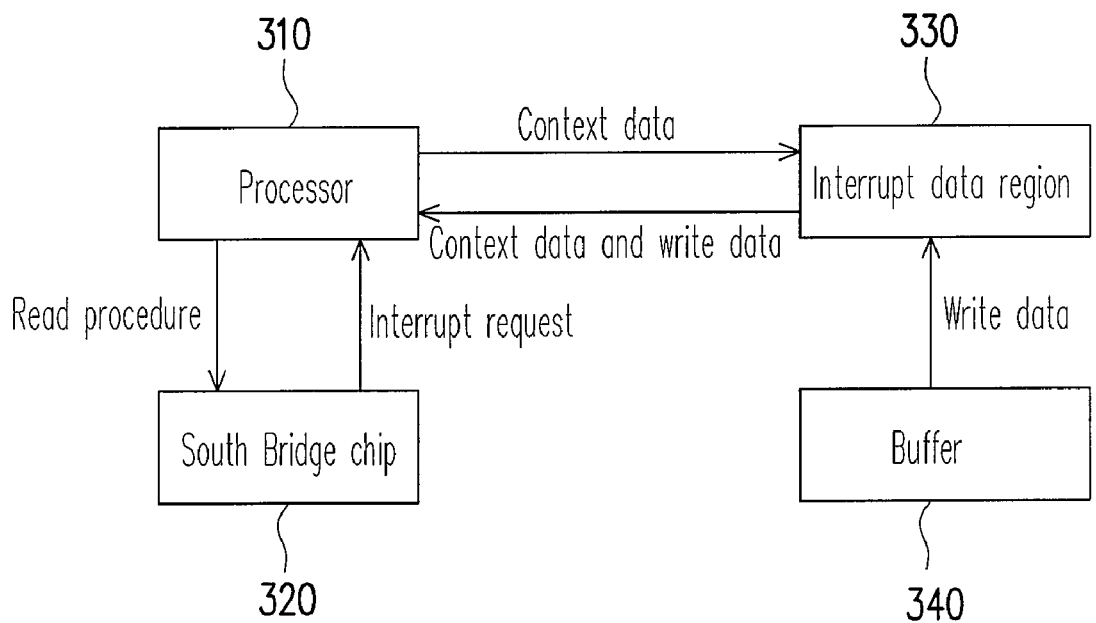
FIG. 4 is a diagram showing a process of reading write data according to one preferred embodiment of the present invention.

FIG. 4 is a diagram showing a process of reading write data according to one preferred embodiment of the present invention. As shown in FIG. 2 and FIG. 4, when the South Bridge chip 320 has trapped the read procedure, an interrupt request is sent to the processor 310 to inform the processor 310 the current I/O cycle is discarded. Similarly, the process 310 executes the system management mode after receiving the interrupt request.

Meanwhile, the context data of the processor is stored in the interrupt data region 330. Then, a processing procedure is executed to replicate the write data stored in the buffer 340 of the processing procedure back to the interrupt data region. After the processing procedure ends, the processor 310 automatically read the original context data and the write data from the interrupt data region, and the read-out write data is served as the read data of the I/O port (step S250). More specifically, the processor 310 responds to the read data of the read procedure by replicating the input data stored in the interrupt data region to a register.

Up to this point, the data reading procedure has completed. Through the foregoing steps, no matter which mode the processor is operating under, it is free to execute read or write operation on the I/O port. There is no need to worry about the condition that some data cannot be read. Hence, the processor can obtain all kinds of test information at any time so that the flexibility of software execution is increased.

It should be noted that the foregoing process of storing the write data also includes restoring the original write procedure after storing the write data so that the I/O port can work normally to output and display the test results. More specifically, the write trap procedure is first disabled and then, according to the original procedure, the write procedure for writing to the I/O port in the I/O cycle is reexecuted. After the execution of the write procedure is finished, the write trap procedure is enabled. Furthermore, the foregoing step of reexecuting the write procedure includes, for example, performing a standard procedure for writing data to the I/O port. Then, the test message is output through the I/O port and displayed through a light emitting diode (LED). The test message, for example, includes a dual-in-line memory module (DIMM) failure message, a fan failure message and a port 80 error detection message. However, the present invention is not restricted to them.

In summary, the method for reading input/output data of the present invention has at least the following merits:

1. By enabling a write trap procedure and a read trap procedure separately, the data previously written to the input/output port can be stored and retrieved by reading from the storage location afterwards.
2. After storing the write data, the original write procedure is restored so that the system can operate normally.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of reading input/output (I/O) port data, especially for reading a read data of an input/output port, comprising:
    enabling a write trap procedure to trap a write procedure in an input/output cycle for writing to the input/output port;
    sending an interrupt request to a processor when the write procedure is trapped;
    storing a context data of the processor, wherein the context data comprises a write data of the input/output port;
    enabling a read trap procedure to trap a read procedure in an input/output cycle for reading from the input/output port; and
    sending the interrupt request to the processor when the read procedure is trapped, and reading the previously stored write data to serve as the read data of the input/output port.

2. The method of reading I/O port data of claim 1, further comprising entering into a system management mode (SMM) after the processor has received the interrupt request.

3. The method of reading I/O port data of claim 1, wherein after storing the context data of the processor, further comprising:
    disabling the write trap procedure;
    reexecuting the write procedure in the input/output cycle for writing to the input/output port; and
    enabling the write trap procedure after the execution of the write procedure is finished.

4. The method of reading input/output port data of claim 3, wherein the step of executing the write procedure in the input/output cycle for writing to the input/output port comprises:
    writing the write data to the input/output port; and
    outputting a test message through the input/output port according to the write data.

5. The method of reading input/output port data of claim 4, wherein the test message is displayed through a light emitting diode (LED).

6. The method of reading input/output port data of claim 5, wherein the test message comprises a dual-in-line memory module (DIMM) failure message, a fan failure message or a port 80 error detection message, or a combination of the above.

7. The method of reading input/output port data of claim 1, wherein the input data is stored in a buffer.

8. The method of reading input/output port data of claim 7, wherein the step of reading the previously stored write data to serve as the read data of the input/output port comprises:

replicating the input data stored in the buffer to a register of the processor; and using the input data stored in the register to serve as the read data of the input/output port.

9. The method of reading input/output port data of claim 8, wherein the step of replicating the input data stored in the buffer to the register of the processor further comprises:

replicating the stored context data to the processor for restoring the processor to normal operation.

10. The method of reading input/output port data of claim 7, wherein after the step of trapping the write procedure and sending an interrupt request to the processor, further comprises:

executing a processing procedure to replicate the write data in the buffer.

11. The method of reading input/output port data of claim 10, wherein after the step of trapping the read procedure and sending an interrupt request to the processor, further comprises:

executing a processing procedure to replicate the write data in the buffer back to an interrupt data region.

12. The method of reading input/output port data of claim 11, wherein the processing procedure comprises a system management interrupt (SMI) handler.

13. The method of reading input/output port data of claim 1, wherein the input/output port is an input/output port of a super input/output chip.

14. The method of reading input/output port data of claim 13, wherein the super input/output chip uses a direct input/output mode when executing a power-on self test (POST).

15. The method of reading input/output port data of claim 14, wherein the super input/output chip still uses the direct input/output mode after executing the power-on self test (POST).

16. The method of reading input/output port data of claim 1, wherein the input/output port comprises a port 80.

17. The method of reading input/output port data of claim 1, wherein the interrupt request is sent by a South Bridge chip.

18. The method of reading input/output port data of claim 1, wherein the interrupt request comprises a system management interrupt (SMI).

* * * * *